US012711647B2

(12) United States Patent
Jiang et al.

(10) Patent No.: US 12,711,647 B2
(45) Date of Patent: Aug. 18, 2026

(54) POSE ESTIMATION ANALYSIS WITH MONOCULAR CAMERA

(71) Applicant: Sportsbox.ai Inc., Bellevue, WA (US)

(72) Inventors: Zhongyu Jiang, Bellevue, WA (US); Haorui Ji, Santa Clara, CA (US); Samuel Menaker, Bellevue, WA (US); Jeehae Lee, San Francisco, CA (US); Michael Rye Kennewick, Sr., Bellevue, WA (US)

(73) Assignee: Sportsbox.ai Inc., Bellevue, WA (US)

( * ) Notice: Subject to any disclaimer, the term of this patent is extended or adjusted under 35 U.S.C. 154(b) by 317 days.

(21) Appl. No.: 18/137,673

(22) Filed: Apr. 21, 2023

(65) Prior Publication Data

US 2023/0342969 A1 Oct. 26, 2023

Related U.S. Application Data

(60) Provisional application No. 63/333,431, filed on Apr. 21, 2022.

(51) Int. Cl.
*G06T 7/70* (2017.01)
*G06T 3/40* (2006.01)
(Continued)

(52) U.S. Cl.
CPC ................. *G06T 7/70* (2017.01); *G06T 3/40* (2013.01); *G06T 7/13* (2017.01); *G06T 15/00* (2013.01);
(Continued)

(58) Field of Classification Search
CPC .... G06T 7/70; G06T 3/40; G06T 7/13; G06T 15/00; G06T 2207/20044;
(Continued)

(56) References Cited

U.S. PATENT DOCUMENTS 4,375,887 A 3/1983 Lynch
5,148,477 A 9/1992 Neely
(Continued)

FOREIGN PATENT DOCUMENTS

| | | |
|---|---|---|
| CN | 104298353 | 1/2015 |
| EP | 2843621 | 3/2015 |
| JP | D1775896 | 7/2024 |

OTHER PUBLICATIONS

Best Performance Group, "Digital Human Modeling", published Feb. 4, 2015, (Retrieved from the Internet Feb. 20, 2025), Internet URL: <https://web.archive.org/web/20150204134536/http://bestperformancegroup.com/?page_id=1683>, (Year: 2015), 11 pages.
(Continued)

*Primary Examiner* — Jennifer Mehmood
*Assistant Examiner* — Vaisali Rao Koppolu
(74) *Attorney, Agent, or Firm* — Sheppard Mullin Richter & Hampton LLP

(57) ABSTRACT

Systems and methods are disclosed for computer vision and AI technology for implementing a temporal-based two-dimensional (2D) human pose estimation method for golf swing analysis using temporal information to improve the accuracy of fast-moving and partially self-occluded key points. The system may, for example, determine a bounding box to incorporate with an image received from a user device; initiate a 2D inference process on the image to generate a final 2D image; provide a final 2D image and set of confidence scores for each corresponding with the key point of the image to a three-dimensional (3D) inference process and Perspective-n-Point (PnP) process; using output from the 3D inference process and the PNP process, generate a 3D image that is altered in accordance with a distance value between the user device and the camera; and provide the 3D image to the user device.

13 Claims, 7 Drawing Sheets

(51) Int. Cl.

| | |
|---|---|
| ***G06T 7/13*** | (2017.01) |
| ***G06T 15/00*** | (2011.01) |
| ***G06V 10/25*** | (2022.01) |
| ***G06V 10/44*** | (2022.01) |
| ***G06V 10/771*** | (2022.01) |

(52) U.S. Cl.
CPC .............. *G06V 10/25* (2022.01); *G06V 10/44* (2022.01); *G06V 10/771* (2022.01); *G06T 2207/20044* (2013.01); *G06T 2207/20081* (2013.01)

(58) Field of Classification Search
CPC . G06T 2207/20081; G06T 2207/30221; G06T 7/20; G06V 10/25; G06V 10/44; G06V 10/771; G06V 10/454; G06V 40/20; G06V 10/82
See application file for complete search history.

(56) References Cited

U.S. PATENT DOCUMENTS

| | | | | |
|---|---|---|---|---|
| 5,249,967 | A | 10/1993 | O'Leary | |
| 5,623,428 | A | 4/1997 | Kunii | |
| 5,772,522 | A | 6/1998 | Nesbit | |
| D400,196 | S | 10/1998 | Cameron, Sr. | |
| 6,083,123 | A | 7/2000 | Wood | |
| D467,251 | S | 12/2002 | Platz | |
| D467,253 | S | 12/2002 | Platz | |
| 6,522,332 | B1 | 2/2003 | Lanciault | |
| 6,710,713 | B1 | 3/2004 | Russo | |
| 7,041,014 | B2 | 5/2006 | Wright | |
| 7,200,266 | B2 | 4/2007 | Ozer | |
| 7,317,836 | B2 | 1/2008 | Fujimura | |
| 7,847,808 | B2 | 12/2010 | Cheng | |
| 7,887,440 | B2 | 2/2011 | Wright | |
| 7,967,695 | B2 | 6/2011 | Voges | |
| 8,165,901 | B2 | 4/2012 | Raymond | |
| 8,189,866 | B1 | 5/2012 | Gu | |
| 8,466,913 | B2 | 6/2013 | Gloudemans | |
| 8,506,425 | B2 | 8/2013 | Wright | |
| RE44,862 | E | 4/2014 | Wright | |
| 8,696,497 | B2 | 4/2014 | Voges | |
| 8,814,754 | B2 | 8/2014 | Weast | |
| 8,950,236 | B2 | 2/2015 | Ishii | |
| 8,979,665 | B1 | 3/2015 | Najafi | |
| 9,161,708 | B2 | 10/2015 | Elliott | |
| 9,211,439 | B1 | 12/2015 | Pedenko | |
| 9,248,361 | B1 | 2/2016 | Jones | |
| D752,646 | S | 3/2016 | Miles | |
| 9,311,789 | B1 | 4/2016 | Gwin | |
| 9,358,456 | B1 | 6/2016 | Challinor | |
| 9,480,883 | B2 | 11/2016 | Ishii | |
| 9,589,207 | B2 | 3/2017 | Holohan | |
| 9,600,717 | B1 | 3/2017 | Dai | |
| 9,623,284 | B2 | 4/2017 | Lafortune | |
| D785,656 | S | 5/2017 | Bramer | |
| 9,656,121 | B2 | 5/2017 | Rose | |
| 9,830,951 | B2 | 11/2017 | Bose | |
| D807,400 | S | 1/2018 | Lagreca | |
| D807,918 | S | 1/2018 | Cohen | |
| 9,878,206 | B2 | 1/2018 | Rowe | |
| 9,898,675 | B2 | 2/2018 | Yee | |
| 9,978,425 | B2 | 5/2018 | Kirk | |
| 10,008,126 | B1 | 6/2018 | Linderman | |
| 10,010,753 | B2 | 7/2018 | Brothers | |
| 10,076,698 | B2 | 9/2018 | Spivak | |
| 10,080,941 | B2 | 9/2018 | Brekke | |
| D835,145 | S | 12/2018 | Cashner | |
| D836,123 | S | 12/2018 | Pillalamarri | |
| 10,186,041 | B2 | 1/2019 | Chang | |
| 10,188,324 | B2 | 1/2019 | Matsunaga | |
| 10,213,645 | B1 | 2/2019 | Wu | |
| 10,271,773 | B2 | 4/2019 | Chang | |
| 10,271,790 | B2 | 4/2019 | Lee | |
| 10,339,978 | B2 | 7/2019 | Bose | |
| 10,410,359 | B2 | 9/2019 | Marks | |
| 10,424,101 | B2 | 9/2019 | Castelli | |
| 10,478,689 | B2 | 11/2019 | Brekke | |
| 10,575,759 | B2 | 3/2020 | Salamatian | |
| 10,748,581 | B2 | 8/2020 | Bose | |
| 10,755,466 | B2 | 8/2020 | Chamdani | |
| 10,799,781 | B1 | 10/2020 | Means | |
| 10,828,549 | B2 | 11/2020 | Li | |
| 10,885,691 | B1 | 1/2021 | Parker | |
| D917,564 | S | 4/2021 | Indorf | |
| D918,932 | S | 5/2021 | Gkanatsios | |
| D922,423 | S | 6/2021 | Frueh | |
| D922,424 | S | 6/2021 | Frueh | |
| 11,040,260 | B1 | 6/2021 | Isgar | |
| D928,189 | S | 8/2021 | Giannino | |
| D936,678 | S | 11/2021 | Frueh | |
| 11,276,196 | B2 | 3/2022 | Bickerstaff | |
| D953,348 | S | 5/2022 | Barnes | |
| 11,348,255 | B2 | 5/2022 | Tamir | |
| D954,108 | S | 6/2022 | Kawano | |
| 11,355,160 | B2 | 6/2022 | Bose | |
| 11,373,354 | B2 | 6/2022 | Tamir | |
| 11,426,099 | B2 | 8/2022 | Barr | |
| 11,450,053 | B1 | 9/2022 | Georgis | |
| D971,964 | S | 12/2022 | Eder | |
| D975,721 | S | 1/2023 | Arima | |
| D982,032 | S | 3/2023 | Putnam | |
| 11,620,783 | B2 | 4/2023 | Kennewick, Sr. | |
| 11,645,873 | B1 | 5/2023 | Lui | |
| 11,648,443 | B2 | 5/2023 | Wycoff | |
| 11,716,629 | B2 | 8/2023 | Devine | |
| D999,244 | S | 9/2023 | Indorf | |
| D999,245 | S | 9/2023 | Indorf | |
| 11,763,697 | B2 | 9/2023 | May | |
| 11,902,651 | B2 | 2/2024 | Paul | |
| 11,938,376 | B2 | 3/2024 | D'Auria | |
| D1,020,788 | S | 4/2024 | Mistry | |
| D1,026,004 | S | 5/2024 | Jang | |
| 11,980,790 | B2 | 5/2024 | Sterling | |
| 11,995,750 | B2 | 5/2024 | Lee | |
| 12,020,380 | B2 | 6/2024 | Malia | |
| D1,035,720 | S | 7/2024 | Lee | |
| D1,035,721 | S | 7/2024 | Lee | |
| D1,036,464 | S | 7/2024 | Lee | |
| D1,037,305 | S | 7/2024 | Yang | |
| D1,053,901 | S | 12/2024 | Clarke | |
| D1,057,748 | S | 1/2025 | Lee | |
| D1,057,749 | S | 1/2025 | Lee | |
| 12,211,307 | B1 * | 1/2025 | Batra | G06V 40/103 |
| D1,061,550 | S | 2/2025 | Chang | |
| D1,061,584 | S | 2/2025 | Lee | |
| D1,061,609 | S | 2/2025 | Chang | |
| D1,061,616 | S | 2/2025 | Chang | |
| D1,061,617 | S | 2/2025 | Lee | |
| D1,061,618 | S | 2/2025 | Lee | |
| D1,062,760 | S | 2/2025 | Chang | |
| D1,066,391 | S | 3/2025 | Lee | |
| D1,066,417 | S | 3/2025 | Lee | |
| D1,066,418 | S | 3/2025 | Lee | |
| D1,066,419 | S | 3/2025 | Lee | |
| D1,074,748 | S | 5/2025 | Lee | |
| D1,076,953 | S | 5/2025 | Reuveny | |
| D1,076,979 | S | 5/2025 | Alvarez | |
| 2001/0029207 | A1 | 10/2001 | Cameron | |
| 2002/0001449 | A1 | 1/2002 | Sato | |
| 2002/0114493 | A1 | 8/2002 | McNitt | |
| 2003/0008731 | A1 | 1/2003 | Anderson | |
| 2003/0054327 | A1 | 3/2003 | Evensen | |
| 2004/0131254 | A1 | 7/2004 | Liang | |
| 2004/0162154 | A1 | 8/2004 | DeJohn | |
| 2005/0261073 | A1 | 11/2005 | Farrington, Jr. | |
| 2006/0059426 | A1 | 3/2006 | Ogikubo | |
| 2007/0135225 | A1 | 6/2007 | Nieminen | |
| 2008/0144964 | A1 | 6/2008 | Soinio | |
| 2008/0318682 | A1 | 12/2008 | Rofougaran | |
| 2009/0002316 | A1 | 1/2009 | Rofougaran | |
| 2009/0094555 | A1 | 4/2009 | Viitala | |
| 2009/0111602 | A1 | 4/2009 | Savarese | |

(56) References Cited

U.S. PATENT DOCUMENTS

2009/0326688 A1 12/2009 Thomas
2010/0081116 A1 4/2010 Barasch
2010/0121227 A1 5/2010 Stirling
2010/0302257 A1 12/2010 Perez
2010/0303303 A1 12/2010 Shen
2011/0054870 A1 3/2011 Dariush
2011/0182469 A1 7/2011 Ji
2011/0276153 A1 11/2011 Selner
2011/0306398 A1 12/2011 Boch
2012/0052971 A1 3/2012 Bentley
2012/0070070 A1 3/2012 Litvak
2012/0116548 A1 5/2012 Goree
2012/0149483 A1 6/2012 Donahue
2012/0236027 A1 9/2012 Ogata
2013/0089845 A1 4/2013 Hutchison
2013/0271458 A1* 10/2013 Andriluka ............. G06V 40/23 345/619
2014/0079290 A1 3/2014 Nakano
2014/0143183 A1 5/2014 Sigal
2014/0193132 A1 7/2014 Lee
2014/0200094 A1 7/2014 Parke
2014/0257538 A1 9/2014 Rose
2014/0337177 A1 11/2014 Pitts et al.
2015/0363644 A1 12/2015 Wnuk
2016/0049089 A1 2/2016 Witt
2016/0059103 A1 3/2016 Han
2016/0148054 A1 5/2016 Han
2016/0246370 A1 8/2016 Osman
2016/0256740 A1 9/2016 Rowe
2016/0370854 A1 12/2016 Steele
2017/0001072 A1 1/2017 Brekke
2017/0043228 A1 2/2017 Hunter
2017/0228587 A1 8/2017 Zhang
2017/0274256 A1 9/2017 Brekke
2017/0316578 A1 11/2017 Fua
2017/0329933 A1 11/2017 Brust
2017/0354859 A1 12/2017 Okazaki
2017/0365085 A1 12/2017 Moll
2018/0050255 A1 2/2018 Maani
2018/0216155 A1 8/2018 Son
2018/0256962 A1 9/2018 Kudirka
2018/0315247 A1 11/2018 Van Andel
2018/0357472 A1 12/2018 Dreessen
2018/0360383 A1 12/2018 Ishikura
2018/0369678 A1 12/2018 Yang
2019/0043240 A1 2/2019 Finegold
2019/0046836 A1 2/2019 Starkey
2019/0087661 A1* 3/2019 Lee ....................... G06V 10/82
2019/0111327 A1 4/2019 Mochizuki
2019/0114690 A1 4/2019 Paquette
2019/0130602 A1 5/2019 Hall
2019/0224528 A1 7/2019 Omid-Zohoor
2019/0347826 A1* 11/2019 Zhang ...................... G06T 7/75
2019/0362506 A1 11/2019 Leroyer
2020/0005544 A1 1/2020 Kim
2020/0005670 A1 1/2020 Iwao
2020/0047029 A1 2/2020 Bentley
2020/0058137 A1 2/2020 Pujades
2020/0074181 A1 3/2020 Chang
2020/0105040 A1 4/2020 Chamdani
2020/0211247 A1 7/2020 Ramachandra Iyer
2020/0222757 A1 7/2020 Yang
2020/0273229 A1 8/2020 Thielen
2020/0294298 A1 9/2020 Chaney
2020/0298057 A1 9/2020 Wycoff
2020/0312037 A1 10/2020 Kopeinigg
2020/0396411 A1 12/2020 Hattori
2020/0398110 A1* 12/2020 Kosowsky ............ A63B 69/36
2021/0004981 A1 1/2021 Song
2021/0065377 A1 3/2021 Das
2021/0089761 A1* 3/2021 Tyomkin ............... G06V 40/23
2021/0089779 A1 3/2021 Chan
2021/0097768 A1 4/2021 Malia
2021/0117661 A1* 4/2021 Iqbal ..................... G06V 10/82
2021/0255826 A1 8/2021 Devine
2021/0283488 A1 9/2021 Putnam
2021/0311546 A1 10/2021 Kodama
2021/0383588 A1 12/2021 Lee
2021/0385417 A1 12/2021 Park
2021/0390748 A1 12/2021 Liao
2022/0023730 A1 1/2022 Howenstein
2022/0036052 A1* 2/2022 Prince ................... G06V 40/28
2022/0107681 A1 4/2022 Ronnau
2022/0111275 A1 4/2022 Bryson
2022/0138966 A1* 5/2022 Sung ...................... G06T 7/246 382/103
2022/0237841 A1 7/2022 Spencer
2022/0241642 A1 8/2022 Halevy
2022/0245836 A1 8/2022 Halevy
2022/0266091 A1 8/2022 Yuen
2022/0379170 A1 12/2022 Menaker
2023/0017367 A1 1/2023 May
2024/0048934 A1 2/2024 Correia
2024/0087367 A1 3/2024 Menaker
2024/0290051 A1 8/2024 Malia

OTHER PUBLICATIONS

"Xsens Extends Industrial Motion Tracking Products with New Rugged Modules for harsh Environments", retrieved from the Internet at <URL: https://www.xsens.com/press-releases/xsens-extends-industrial-motion-tracking-products-with-new-rugged-modules-for-harsh-environments>, May 20, 2021 (Year: 2021), retrieved from the Internet on Nov. 8, 2022, 3 pages.

Ke, Shian-Ru, et al., "A Review on Video-Based Human Activity Recognition", Computers, vol. 2, doi: 10.3390/computers2020088, 2013, pp. 88-131.

Lemire, Joe, "Track160's New App Lets Players Share Video and Advanced Analysis, Creating New Fan Engagement Opportunities", SportTechie | Sports Business Journal, Jul. 27, 2022, 5 pages.

Wei et al., "Intuitive Interactive Human-Character Posing with Millions of Example Poses", IEEE Computer Society, Jul./Aug. 2011 (Year: 2011), pp. 78-88.

Barcenas, Tere, "Rare Golf Mobile App MVP design", Tere Barcenas—UX Designer, published Feb. 2021, Retrieved from the Internet Oct. 31, 2023 at <URL: https://www.terebarcenas.com/projects/rare-golf> (Year: 2021), 5 pages.

Kennedy, Jamie, "SkyPro Swing Analyser Review", Golfalot, published Sep. 4, 2013, Retrieved from the Internet Oct. 31, 2023, at <URL: https://www.golfalot.com/equipment-reviews/skypro-swing-analyser-review-2555.aspx> (Year: 2013), 2 pages.

Rowe, Jared Alan, "Motion Capture: Golf Swing App", Carbonmade, dated 2014 (Retrieved from the Internet Jul. 9, 2025), Internet URL: <https://jarowe.carbonmade.com/projects/5434999>, (Year: 2014), 8 pages.

* cited by examiner

POSE ESTIMATION ANALYSIS WITH MONOCULAR CAMERA

CROSS REFERENCE TO RELATED APPLICATIONS

The application is a non-provisional patent application of U.S. Patent Application No. 63/333,431, filed Apr. 21, 2022, which is incorporated by reference in its entirety.

TECHNICAL FIELD

The disclosed technology relates generally to computer vision and artificial intelligence (AI) technology for implementing a temporal-based human pose estimation method for golf swing analysis using temporal information to improve the accuracy of fast-moving and partially self-occluded key points.

BRIEF SUMMARY OF EMBODIMENTS

Systems, methods, and computer readable media are disclosed for computer vision and AI technology for implementing a lightweight temporal-based 2D and 3D human pose estimation method for golf swing analysis using temporal information to improve the accuracy of fast-moving and partially self-occluded 2D key points. For example, the human pose estimation system may use an input sequence of normalized 2D poses to generate an output of normalized 3D pose estimation (e.g., associated with the center frame). Then, post-processing of the 3D pose estimation may recover the scale of the 3D skeleton (e.g., with the help of user's pelvis length or other skeletal measurements) and project the 3D skeleton back to the camera coordinate system that may be similar to a generic Perspective-n-Point (PnP) process with non-obvious enhancements and features.

Some aspects of the invention relate to computer vision and AI technology for implementing a temporal-based human pose estimation method for golf swing analysis using temporal information to improve the accuracy of fast-moving and partially self-occluded key points. The system may be lightweight in that it removes at least one AI convolution layer in standard convolution cycles of the AI model, which may use fewer computational resources when compared with standard modules and only slightly decrease the prediction accuracy. The convolution layer that is removed may provide computational predictions below a threshold value. The prediction algorithm that utilizes the remaining AI convolution layers may also be modified to be lightweight so that the system can use fewer computational resources and maintain performance on a mobile device.

As an illustrative example, the system may implement the following process to perform pose estimation using a monocular camera. For example, a series of images are received from a mobile device of the user. A bounding box may be programmatically placed around the key points of user and 2D inference may be initiated to determine X and Y coordinates with a confidence score for each point. Using the coordinates and confidence score, a 3D inference may be initiated with the confidence score. The 3D inference may determine a 3D estimation of user's pose using the two-dimensional image data and confidence score. The system may implement additional data augmentation and data cleaning process does for noisy data. The system may rescale the 3D estimation of the user's pose using skeletal measurements found in a user profile (e.g., pelvis or torso size that is entered by a user in generating the user profile).

The 3D estimation may be rescaled based on the skeletal measurements and camera intrinsic values associated with the mobile device. Using the confidence scores from the 2D inference process, the system may determine which he points to use. The system may also determine a distance from the camera using a PNP algorithm. The final 3D image may be determined.

The user's body frame or sports equipment may be partially self-occluded in the 2D image. The system may determine the key point that is partially occluded in the process of determining 2D pose estimation by continuing to determine the X and Y coordinates with a confidence score for each point. The occluded key points may have a lower confidence score that non-occluded key points, but may continue to exceed a confidence score threshold. When the key points and confidence scores are determined, the occluded key points may be estimated in the 2D image to continue to provide data points in determining the final 3D image.

Various embodiments include using golf specific videos to build 2D models for golf swing analysis, using a temporal 2D model (e.g., using three frames instead of one to perform inference) and using line segment based golf club pose estimation to further improve pose estimation accuracy.

Various embodiments provide an accurate and efficient human pose estimation method which is tailored for a reliable golf swing analysis. The temporal-based lightweight 2D human pose estimation model can be run on mobile devices for golf swing analysis.

More specifically, some embodiments relate to a computer-based system specifically targeted at golf swing analysis, where the system involves generating an accurate 2D pose estimation model from a golf swing video taken from a mobile device. The system deploys a temporal 2D pose estimation model based on existing single frame pose estimation frameworks. Based on the system input being a video sequence instead of a single image, the system is able to utilize temporal information to increase the accuracy of key point prediction.

The system may also implement a line segment based golf club pose estimation algorithm, using various computer vision techniques, to fix inaccurate predictions on golf club key points generated from the previous step (generation of the 2D pose estimation model from a golf swing video).

This includes using a 3 frame video clip input, processing the image frames via an artificial intelligence process that incorporates convolution and pooling. The convolution and pooling process may be performed by a mobile device with the help of TensorFlow Lite® framework. The mobile device may transmit the output to a Temporal Attention (TA) Module of the Biomechanical Analytics Computer System illustrated in FIG. 1. The output of the TA module is passed to the Pose Estimation Network of the Biomechanical Analytics Computer System illustrated in FIG. 1.

More specifically, let $S \in \mathbb{R}^{L \times H \times W \times C}$ be the input video of length L, a goal is to predict 2D key points $J \in \mathbb{R}^{N \times 2}$ for some or all of the frames in the video sequence, where N stands for the number of key points.

The system may implement a sequence-based process. In some examples, the system may operate on short video clips: $C=\{F_{t-1}, F_t, F_{t+1}\}$ and can output the pose estimation result for the center frame.

The system is based on a top-down pipeline which first detects people bounding boxes and then predicts their joint locations within each region. The pipeline to conduct human pose estimation may be composed of the following parts: First, the input will go through a stem used to decrease the resolution so that later steps will not take on too much computational burden. Then, a main feature extraction component will be applied, which processes the low-level feature through a stacked-hourglass like architecture and outputs features containing both high-level and low-level information about certain key points. Finally, a heatmap regressor will produce heatmaps for some or all of the key points through several simple convolutions and generate key point locations under the original resolution.

The pipeline may use known pose estimation architecture, for example, a Lightweight Pose Network (LPN). LPN uses a trained machine learning model (e.g., ResNet) as the backbone and replaces the standard bottleneck blocks with their lightweight bottleneck blocks. Two modifications made on the building block are as follows: First, the system may replace the standard convolution operation with depthwise convolution, which can drastically reduce the number of parameters. Second, in order to compensate for the decrease of the network's modeling capability due to the decrease in the number of parameters, LPN also equips its lightweight bottleneck with a global context aggregation building block, which uses an attention mechanism to capture non-local information.

Based on LPN's architecture, the system can present the following revision targeted especially at our application scene: golfer's pose estimation on mobile devices. Since the system may deploy the model on mobile devices with limited computation resources, the system may determine building blocks of image processing and action analysis (like global context blocks) without diminishing the performance. However, these operations cannot be accelerated by the GPUs on phones and tablet PCs, making the application too slow to run.

In addition, since our model is temporal-based instead of single image-based, the system may adopt the temporal-attention idea and manage to utilize temporal information from previous and next frames to elevate performance. Specifically, the system may expand the 2D convolutions in the stem stage of the original architecture to 3D to help the network learn to associate information not only within the same image but also across different images.

Due to the fast movement of the golf club during the swing, problems like motion blur or golf club hosel may move out of the image boundary. These issues greatly hinder the performance of key points prediction, especially the points on golf club hosel, which is crucial for analyzing golf players' swing.

To address the problem of inaccurate golf club hosel prediction, the system may resort to traditional computer vision techniques. Unlike deep learning-based methods, which provide data-driven solutions, the system may use more rigorous geometric constraints to make up for the scenarios where deep learning models under-fit or overfit.

Based on the prediction results from the pose estimation model, the system compute the bounding box that covers the whole golf club and applies the line segment detection algorithm from OpenCV to the cropped region. The output of the line segment detection gives us lots of unconnected, short line segments pointing in various directions since line segment detection only depends on pixel information and will be significantly influenced by other line-shape elements in the environment, like grass and ground.

Algorithm 1 describes how the proposed method removes outliers that do not lie on the golf club and extract the whole golf club out of redundant and lousy detections. First, the system may set the initial golf club as the vector pointing from the club top of the handle to the middle of the handle based on the key point location from the pose estimation model. Next, the system may select all line segments whose direction is consistent with the reference direction and send them to the next stage. Then the system may implement an iterative process to connect line segments and generate potential golf club lines. The iterative process may be implemented by maintaining a list for every potential golf club line. Initial values for these lists are lines whose start point is closest to the middle of the handle point. In every iteration step, the system may use all line segments from each list to form a candidate line and see if it can represent the whole golf club. The system may also find a new line segment to append to one of the lists. The appended line segment can have a consistent direction with its corresponding candidate line, and the distance between these two lines, which is computed as the distance between the first one's end point and the second one's start point, needs to be within a threshold. This iteration process will repeat until no line segment can be added to any list, and the longest candidate line will be regarded as the updated golf club line.

In order to incorporate the modeling abilities of both the deep learning model and traditional computer vision technique, the system can merge the prediction results from both methods.

The merging mechanism is that if the direction of the original and updated golf club line is consistent, the hosel point is projected from the pose estimation model to the updated golf club line. Otherwise, the system may trust the line segment detection algorithm more and directly set the final club hosel prediction as the end point of the updated golf club line.

In order to furthermore improve the inference speed of the temporal-based model, the system may modify the original temporal attention module by replacing the 3D convolution with 2D convolution or depthwise 2D convolution. In some examples, the GFLOPs and inference time will significantly decrease with the modification while keeping the similar performance, which shows that depthwise 2D convolution based temporal attention module is the best choice for mobile device inference with the balanced accuracy and inference speed.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Figure 1:
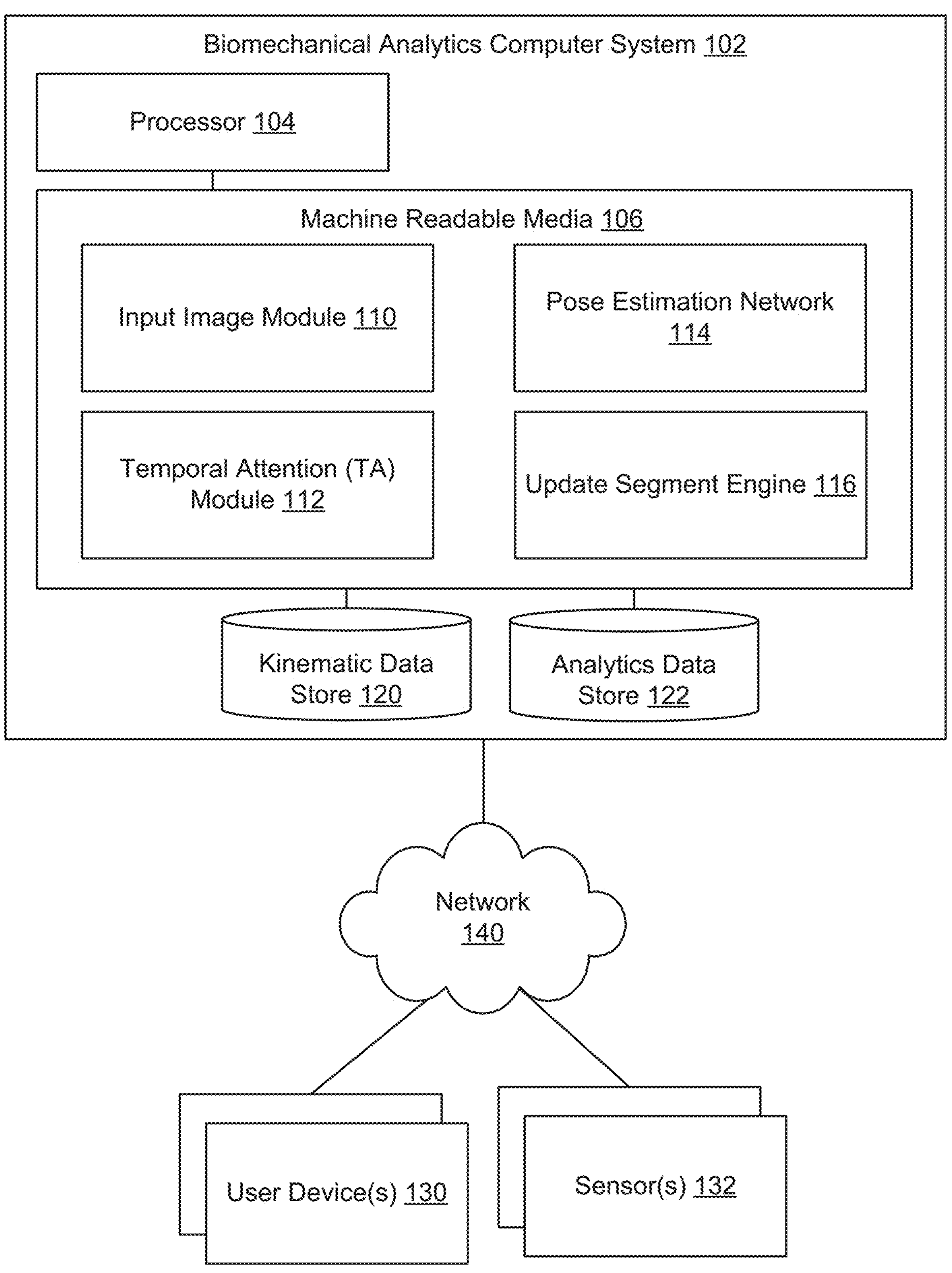
FIG. 1 illustrates a biomechanical analytics computer system, in accordance with the embodiments disclosed herein.

FIG. 1 illustrates a biomechanical analytics computer system, in accordance with various embodiments disclosed herein. In this example, biomechanical analytics computer system 102 may communicate with one or more user devices 130, sensors 132 via network 140 and/or other hardware and software. Biomechanical analytics computer system 102 may include processor 104 and machine-readable storage medium 106 in communication with one or more data stores, including kinematic data store 120 and analytics data store 122.

Processor 104 may be one or more central processing units (CPUs), semiconductor-based microprocessors, and/or other hardware devices suitable for retrieval and execution of instructions stored in machine-readable storage medium 106. Processor 104 may fetch, decode, and execute instructions to control processes or operations for optimizing the system during run-time. As an alternative or in addition to retrieving and executing instructions, processor 104 may include one or more electronic circuits that include electronic components for performing the functionality of one or more instructions, such as a field programmable gate array (FPGA), application specific integrated circuit (ASIC), or other electronic circuits.

Machine readable media 106 may be any electronic, magnetic, optical, or other physical storage device that contains or stores executable instructions. Thus, machine-readable storage medium 106 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 106 may be a non-transitory storage medium, where the term "non-transitory" does not encompass transitory propagating signals. As described in detail below, machine-readable storage medium 106 may be encoded with executable instructions for running various processes and engines described throughout the disclosure.

Machine readable media 106 may comprise one or more applications, engines, or modules, including image input module 110, temporal attention (TA) module 112, pose estimation network 114, and update segment engine 116.

Image input module 110 may receive image data as input from user device(s) 130, sensor(s) 132, or other sources. The images may be received as a set of images (e.g., three subsequent images from a video file of a golf swing video taken from user device 130). The data may be stored in analytics data store 122 in association with the human user that is performing a human movement.

The image data may be added to a user profile. The user profile may comprise data about a particular user, including gender, height, type of activity, skeletal measurements (e.g., shoulder width, pelvis width, torso length, and other measurements), handicap, club type, phone type, and other information associated with the user.

User profile information may be used with rescaling the image data from user device 130 or sensors 132. For example, the system may determine the skeletal measurement from the user profile and compare the measurement with the same skeletal measurement from the image data. The distance between the user and the user device/sensor may be determined based on the comparison.

User profile information may be used with determining accuracy. For example, after the 3D inference process is initiated, the process may determine a 3D pose estimation of the user and then rescale the 3D image based on the skeletal measurements provided by the user in the user profile. The 3D image may be resized based on the user profile information when the 3D pose estimation determines a confidence score that exceeds a threshold value (e.g., identifying a good estimated value by the system), but the estimated measurements exceed an accuracy threshold from values stored in the user profile. In some examples, the values provided by the user to the user profile may be ranked higher than the ones determined by the process, and vice versa.

Image input module 110 may adjust the quality of the image or video from user device(s) 130, sensor(s) 132, or other sources. For example, the image quality may be measured against a threshold value to determine if the image is too bright, too dark, etc. Image input module 110 may adjust various camera characteristics and camera positions for the image or video data including, but not limited to, angle, tilt, or focal length. In some examples, the image quality may be reduced to reduce the overall size of the image file.

Image input module 110 may adjust the image or video by automatically changing the frames per second input value. For example, the image quality can be determined to be above the threshold value. Image input module 110 may initiate down-sampling, compression, or decimation to resample the image or video and reduce the image quality and/or match a predetermined frames per second value.

Image input module 110 may determine one or more derivative values (e.g., third order or jerk, fourth order or snap, etc.). The measurement of values in the motion trackers from the input images may be used to calculate the derivation of kinetic parameters from motion tracker recordings.

Other categories may include domain-specific information in other categories that are context specific. For example, in golf, the par rating for the hole, which is a domain-specific piece of environmental/geographic data, or an opponent's or playing partner's current score on the hole or in the round.

Temporal attention (TA) module 112 may access the images or video stored in analytics data store 122 and identify a human movement that is closest to the movement performed in the images or video. The available human movements may be stored in kinematic data store 120. In some examples, the available human movements may be stored in kinematic data store 120 may be compared with the received images or video stored in analytics data store 122. TA module 112 may determine the human movement with the highest likelihood of matching (e.g., the greatest percentage match in accordance with a confidence score, the percentage match above a threshold value, etc.).

Temporal attention (TA) module 112 is configured to receive 2D convolution and pooling data associated with the set of images to implement the temporal attention process. The 2D convolution and pooling process can apply a 2D filter over each channel of feature map and summarize the features lying within the region covered by the filter. The summarized features may correspond with the output received at the TA module 112.

TA module 112 is configured to identify a specific instance of time in the output (e.g., over three image frames). More specifically, if the system lets $S \in R^{L\times H\times W\times C}$ be the input video of length L. TA module 112 may predict 2D key points $J \in R^{N\times 2}$ for some or all of the frames in the video sequence, where N stands for the number of key points. Using a sequence-based process, TA module 112 may operate on short video clips: $C=\{F_{t-1}, F_t, F_{t+1}\}$ and can output the pose estimation result for the center frame to pose estimation network 114, as illustrated in FIG. 4.

The objects may be identified within a bounding box. For example, TA module 112 may identify a rectangular space around the domain specific objects, including a user's body parts that correspond with the domain and any relevant non-user objects for the domain. Coordinates of the bounding box may be identified in the first image frame. As the movement progresses, the outline of the bounding box may be adjusted for subsequent image frames to encompass the same user's body parts and relevant non-user objects for the domain that were identified in the initial image frame. The objects that are captured within each bounding box may be added to the watch list and the objects that are outside the bounding box may be removed from the watch list (e.g., to help limit clutter and irrelevant objects as input to the machine learning model, etc.). In some examples, TA module 112 may detec the people bounding boxes and then predicts their joint locations within each region.

Figure 4:
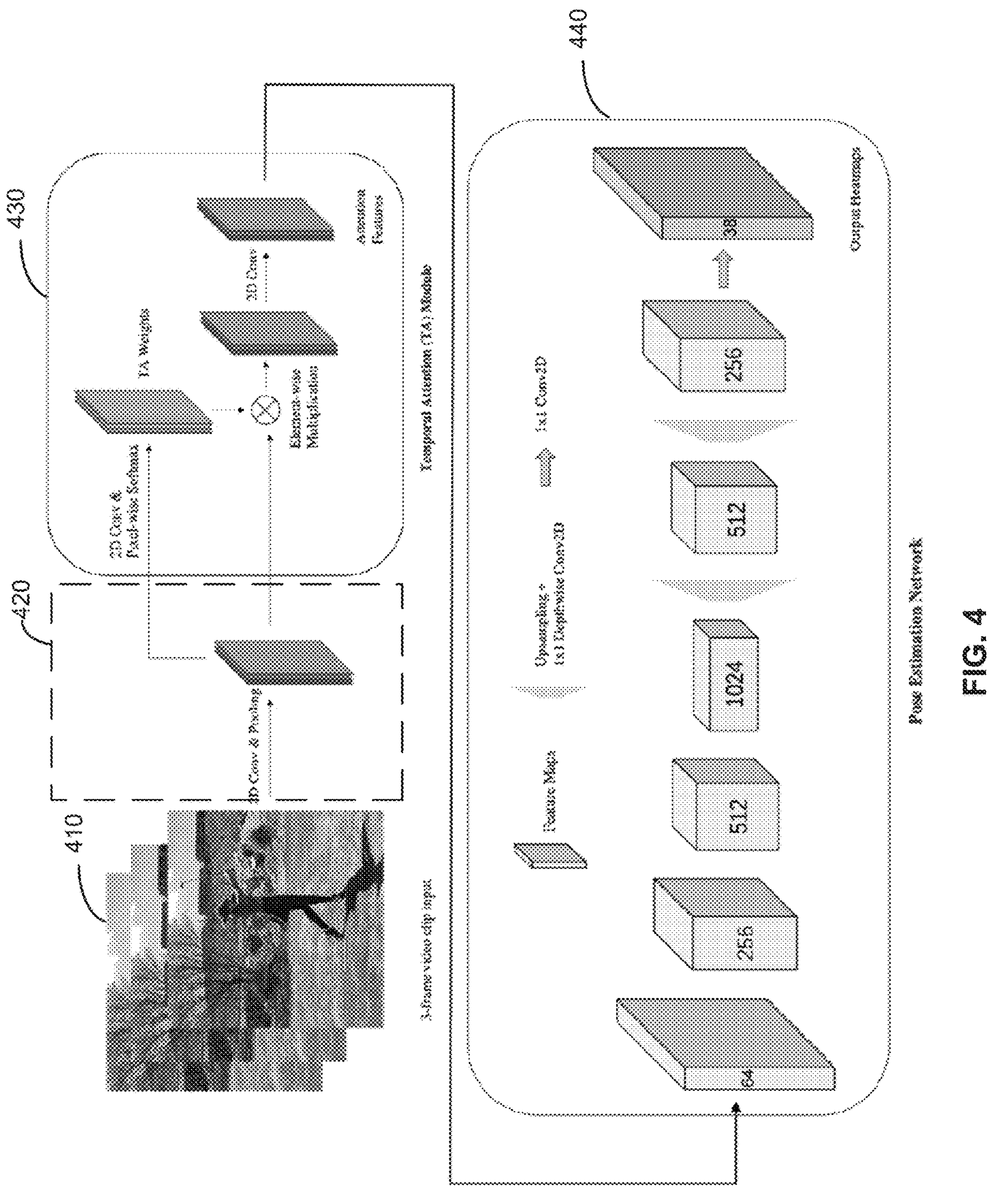
FIG. 4 illustrates a processing pipeline for pose estimation using one or more input images, temporal attention (TA) module, and pose estimation network, in accordance with the embodiments disclosed herein.

TA module 112 is also configured to implement a 2D convolution and pixel-wise Softmax process, determine TA weights, implement an element-wise multiplication, and generate attention features from the 2D convolution, as illustrated with FIG. 4.

Pose estimation network 114 may access analytics data store 122 and learn dependencies between limbs and joints using a large set of images and video of human movements captured from user devices 130 and sensors 132.

Pose estimation network 114 is also configured to train and implement a machine learning model. For example, the pose estimation may implement a Lightweight Pose Network (LPN) that corresponds with a trained machine learning model (e.g., ResNet). In this process, the standard convolution operation in a LPN may be replaced with depthwise convolution, which can reduce the number of parameters and increase computing effeciency. In some examples, in order to compensate for the decrease of the network's modeling capability due to the decrease in the number of parameters, the process may implement a global context aggregation building block that uses an attention mechanism to capture non-local information. In some examples, the LPN may incorporate spatial attention as the attention mechanism. In some examples, the attention mechanism may be removed when it is incompatible with mobile inference.

The machine learning model may be, for example, a deep convolution neural network. The mapping may be stored as a representation of available human movement in kinematic data store 120.

Pose estimation network 114 may train one or more ML models by correlating examples of swing motions, human movements, or other performances with the outcome that were produced. Image input module 110 may record the user movement, outcome data, and context data (e.g., measurements of environmental factors) simultaneously to correlate the data with each other to create a cause and effect relationship by the model to a relatively high confidence determination.

Pose estimation network 114 may build one or more 2D models for golf swing analysis using a temporal 2D model (e.g., using three frames instead of one to perform inference) and using line segment based golf club pose estimation to further improve pose estimation accuracy. For example, user device 130 may provide a golf swing video (e.g., input images). The pose estimation may use a temporal 2D pose estimation model based on existing single frame pose estimation frameworks. Based on the system input being a video sequence instead of a single image, the system is able to utilize temporal information to increase the accuracy of key point prediction.

Pose estimation network 114 may generate a 3D model from a 2D model. For example, image input module 110 receives a stream of images or video from user device(s) 130, sensor(s) 132, or other sources and sends them frame by frame to pose estimation network 114 as a 2D image. Pose estimation network 114 may generate a 2D frame for each image frame. In some examples, each 2D frame may contain 2D coordinates for each body part or some subset thereof (e.g., the body parts or limbs that are moving in a particular context, etc.). Pose estimation network 114 may collect the 2D frames and start streaming these frames to a 3D ML model. In addition to set of 2D frames, pose estimation network 114 may send the 3D ML model various parameters, including body measurements, camera settings or intrinsic values, environment conditions, and the like. The output of this process may comprise a set of frames with 3D coordinates.

Pose estimation network 114 is also configured to use the input sequence of normalized 2D poses to generate an output of normalized 3D pose estimation (e.g., associated with the center frame). Then, post-processing of the 3D pose estimation may recover the scale of the 3D skeleton (e.g., with the help of user's pelvis length or other skeletal measurements) and project the 3D skeleton back to the camera coordinate system by the Perspective-n-Point (PnP) algorithm. In some examples, the scale and ratio values of the 3D skeleton may be stored by the system and accessed by pose estimation network 114. In some examples, the camera coordinate system is static and the system may assume that the camera is not moving during the image capturing and pose estimation process.

Pose estimation network 114 may implement an inference process based on a machine-learned model. For example, the body parts included in the watch list may be tracked for movement, angle, rotation, and the like. These changes in position may be data points that are input to a machine learning model that are used to infer a resulting action in the context (e.g., jumping over a hurdle, hitting a ball with a racquet, etc.).

Figure 2:
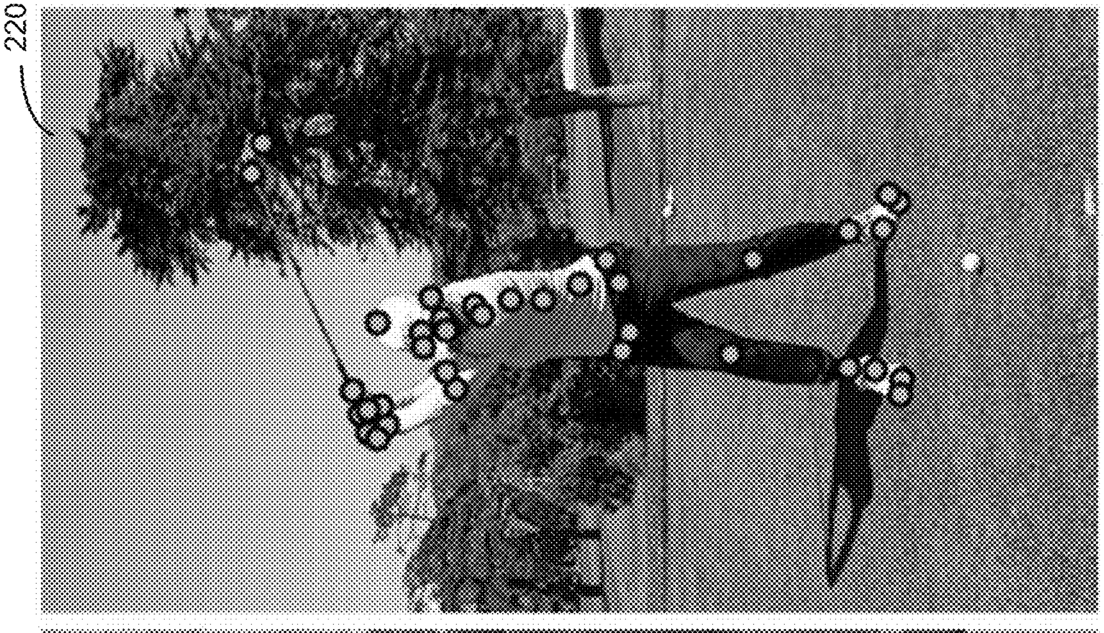
FIG. 2 illustrates sample images incorporating pose estimation, in accordance with the embodiments disclosed herein.
Figure 2:

Pose estimation network 114 may determine the coordinates of the bounding box. For example, the bounding box may be determined based on objects identified in the image frame and/or based on similar images in the same domain during the ML training process. 3D avatar engine 114 may automatically generate a 3D avatar from images or video stored in analytics data store 122 (e.g., a single-viewpoint recording from one or more sensors 132, etc.). This may include detecting multiple joints through a 3D pose estimation. For example, a 3D pose estimation may produce a 3D pose that matches the spatial position of the depicted human (e.g., bending at the waist, twisting, etc.). An illustrative input image 210 and 3D pose 220 is provided in FIG. 2.

Pose estimation network 114 may correlate the attention features output from TA module 112 to generate one or more heatmaps. Pose estimation network 114 may be modified from LPN. After heatmaps are generated, pose estimation network 114 is able to find the corresponding key point positions from the heatmap and send them to 3D pose estimation network for further analyses.

In some examples, the 3D pose estimation may correspond with a discriminative method or regression. After extracting features from the image, a mapping may be learned (e.g., via pose estimation network 114, etc.) from the feature space to the pose space. Using the articulated structure of the human skeleton (e.g., stored in kinematic data store 120, etc.), the joint locations may be highly correlated and predictable based on the limitations of each limb/joint.

Update segment engine 116 is configured to detect one or more line segments using Algorithm 1, illustrated herein:

---

Algorithm 1 Line Segment Detection

---

Input: Image $I_t$, Position of club mid hands $J_{md}$, top of handle $J_{handle}$, hosel $J_{hosel}$ Output: Updated hosel position $J_{hosel}$ $\vec{D}_{init} \leftarrow J_{md}$ − handle Compute bounding box covering whole golf club and crop out this region Apply Line Segment Detection from OpenCV and assign results as list of line segments, L for all line in L do if (line, $\vec{D}_{init}$) >= 15° then remove line Find N line segments with the smallest distance to $J_{md}$ Set searching space as all line segments that are not included in any of these N line segments for all line in N line segments do while searching space ≠ Ø do nline ← line segment with minimum distance mdist to line if mdist < thre then line ← connect start of line with end of nline.

remove nline in searching space else break $L_{club}$ ← longest line from N lines.

if ($L_{club}$, $\vec{D}_{init}$) < 15° then $J_{hosel}$ ← projection of $J_{hosel}$ in the direction of $L_{club}$ else $J_{hosel}$ ← end point of $L_{club}$

---

Update segment engine 116 is also configured to remove outlier pixels or lines that do not lie on the golf club and extract the whole golf club out of redundant and lousy detections. First, the system may set the initial golf club as the vector pointing from the club top of the handle to the middle of the handle based on the key point location from the pose estimation model. Next, the system may select all line segments whose direction is consistent with the reference direction and send them to the next stage. Then, the system may implement an iterative process to connect line segments and generate potential golf club lines. In some examples, this may be implemented using a list of every potential golf club line. Initial values for these lists are lines whose start point is closest to the middle of the handle point. In each iteration step, the system may use all line segments from every list to form a candidate line and see if it can represent the whole golf club, and the system may also find a new line segment to append to one of the lists. The appended line segment should have a consistent direction with its corresponding candidate line, and the distance between these two lines, which is computed as the distance between the first one's end point and the second one's start point, needs to be within a threshold. This iteration process may repeat until no line segment can be added to any list, and the longest candidate line will be regarded as the updated golf club line.

Update segment engine 116 is also configured to merge processes to generate an output heatmap. For example, the merging mechanism may consider whether the direction of the original and updated golf club line are consistent. If so, the hosel point (of the golf club) may be projected from the pose estimation model to the updated golf club line. Otherwise, results from the line segment detection algorithm may be used and directly set the final club hosel prediction as the end point of the updated golf club line.

Figure 3:
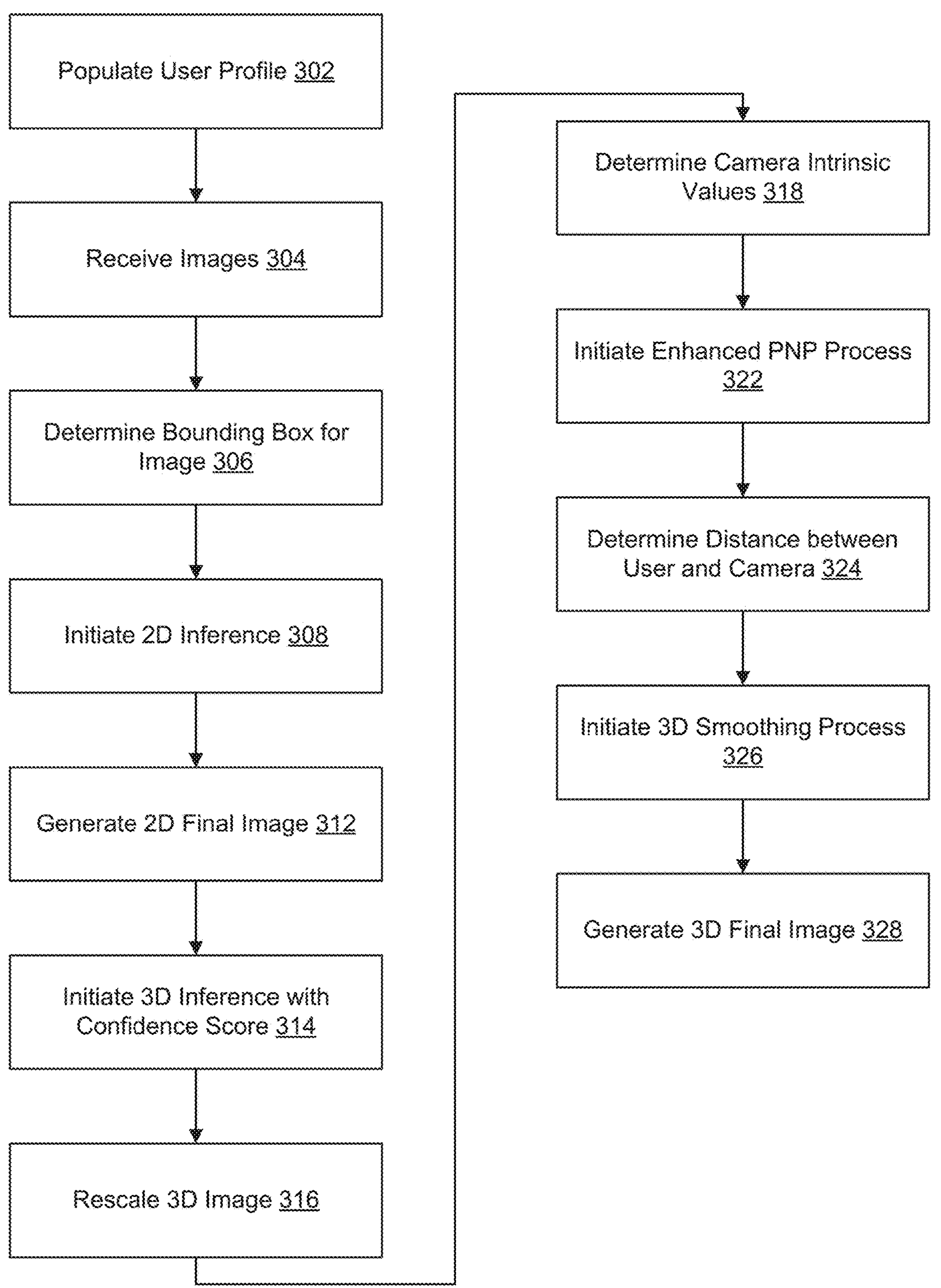
FIG. 3 illustrates a process for performing pose estimation analysis with a monocular camera, in accordance with the embodiments disclosed herein.

FIG. 3 illustrates a process for performing pose estimation analysis with a monocular camera. The process may be implemented by biomechanical analytics computer system 102 of FIG. 1.

At block 302, a user profile may be populated. The user profile may comprise data about a particular user, including gender, height, type of activity, skeletal measurements (e.g., shoulder width, pelvis width, torso length, and other measurements), handicap, club type, phone type, and other information associated with the user. The user profile may also correspond to the series of images are received from a mobile device of the user.

At block 304, the images from the user device or sensor (e.g., camera or image sensor, etc.) may be received. For example, a series of images may comprise at least three images received from a mobile device of the user and the system may select the middle/second image from the series of images as a representative image.

At block 306, a bounding box may be programmatically placed around the key points of user in the representative image. For example, the system can predict the location of golf club and user using traditional computer vision techniques. This can include training a machine learning (ML) model to recognize people, golf clubs and other sports equipment based on images that show these objects and do not show these objects. The ML model may programatically learn the differences between the pixel data and objects in the image to recognize people, golf clubs, etc. in other images. The recognized objects determined by the traditional computer vision techniques may be used to generate the bounding box, including the predicted location determined by the computer vision techniques to place a bounding box around the golf club and the user.

At block 308, a 2D inference may be initiated to determine X and Y coordinates with a confidence score for each point. For example, the 2D inference process may apply a line segment detection algorithm to the portion of the image within the bounding box. The output of the line segment detection generates a set of unconnected, short line segments pointing in various directions. The generation of the unconnected line segments may only depend on pixel information, rather than connecting lines in the image.

A confidence score may also be generated for each point using a line segment detection algorithm. The confidence score may correspond with a number between 0 and 1 that represents the likelihood that the output of the line segment detection algorithm (e.g., the identification of key points) within the bounding box is correct.

In some examples, the line segment detection algorithm may be implemented as a trained ML model where the number of layers in a convolution of the ML model are reduced. This may be a technical improvement in comparison to other systems, so that a user device may execute the ML model locally at the device using fewer computational resources than other ML models.

In some examples, the system may implement additional data processing on the 2D image. For example, the system may implement data augmentation to reduce pixel values in the image, for example, to reduce brightness, reduce motion blur, or increase contrast in the image. In some examples, the image may not be additionally smoothed to maintain a minimum accuracy value. The image smoothing process may be performed once on the 3D image below, or not at all.

In some examples, the generation of the unconnected line segments may be negatively influenced by other line-shape elements in the environment, like grass and ground. In this example, the generation of the line segments may be limited to line segments within the bounding box around the golf club and the user.

In some examples, the 2D inference process may receive a set of three images to build a 2D model for golf swing analysis. For example, the 2D inference process may use a temporal 2D model (e.g., using three frames instead of one to perform inference) and use the line segments based golf club pose estimation to further improve pose estimation accuracy.

At block 312, a final 2D image may be generated. The final 2D image may be similar to the received 2D image from the user device with the additional identification of X and Y coordinates for the key points of the user and a confidence score for each point.

At block 314, using the coordinates and confidence score, a 3D inference may be initiated with the final 2D image and confidence score from the 2D inference process. For example, the 3D inference may determine a 3D estimation of user's pose using the 2D image data, output from the 2D inferences, and the confidence score.

In some examples, the system may implement additional data processing on the 2D image. For example, the system may implement data augmentation to add data from the user profile (e.g., skeletal measurements, etc.) to image data. The data augmentation may also reduce pixel values in the image, for example, to reduce brightness or increase contrast in the image. In some examples, the system may implement a data cleaning process does for noisy data to remove improper pixel definitions and image data from the images.

At block 316, the system may rescale the 3D image of the user's pose using skeletal measurements found in a user profile (e.g., pelvis or torso size that is entered by a user in generating the user profile).

At block 318, the system may rescale the 3D image of the user's pose using camera intrinsic values. The 3D estimation may be rescaled based on camera intrinsic values associated with the mobile device.

At block 322, the system may initiate an enhanced PNP process. For example, using the confidence scores from the 2D inference process, the system may determine which points to assign as corresponding key points. For example, the enhanced Perspective-n-Point (PnP) problem attempts to estimate a relative pose of the user between an object and the camera, given a set of correspondences between 3D points and their projections on the image plane.

$$\min \sum_{i=0}^{n} \left\| c_i \left( K \begin{bmatrix} 1 & 0 & 0 & t_x \\ 0 & 1 & 0 & t_y \\ 0 & 0 & 1 & t_z \end{bmatrix} \begin{bmatrix} X_i \\ Y_i \\ Z_i \\ 1_i \end{bmatrix} - s \begin{bmatrix} x_i \\ y_i \\ 1_i \end{bmatrix} \right) \right\|_2^2$$

At block 324, the system may determine a distance from the camera. For example, using the enhanced PNP process, the output from the pose estimation may provide additional information on the placement of the user and other objects, including the golf club or other sport equipment in the original series of images, and the distance of these objects from the camera.

At block 326, the system may initiate a 3D smoothing process on the 3D image. For example, the system may implement a Butterworth filter designed to have a frequency response that is substantially flat in the passband. This may help implement additional image sharpening in the frequency domain, such that fine details are enhanced and the edges of the objects (e.g., user, golf club, etc.) are highlighted in the 3D image. When a highpass filter is implemented, the process can also remove low-frequency components from an image and preserve high-frequency components.

At block 328, the system may generate the final 3D image after the 3D smoothing process has completed. In some examples, the final 3D image is provided to a user interface or other device via a network connection.

FIG. 4 illustrates a processing pipeline for pose estimation using one or more input images, temporal attention (TA) module, and pose estimation network, in accordance with the embodiments disclosed herein.

At block 410, input images is received via image input module 110. In some examples, image input module 110 may process the set of input images to decrease the resolution of each image (e.g., to stem the image). This may help reduce computational burden for the overall system. The input may be mapped as a tensor with a shape of (number of inputs)×(input height)×(input width)×(input channels).

At block 420, 2D convolution and pooling is implemented (e.g., at a mobile device). The convolutional layers may convolve the input and pass its result to the next layer to classify the data at each layer, while the pooling layers can reduce the dimensions of data by combining the outputs of neuron clusters at one layer into a single neuron in the next layer. Each step may include local and/or global pooling layers along with traditional convolutional layers.

At block 430, the TA module receives the 2D convolution and pooling and generates the attention features. The attention features may be generated by applying a depthwise 2D convolution and pixel-wise softmax. For example, the depthwise convolution may correspond with a type of convolution in which each input channel is convolved with a different kernel (e.g., the depthwise kernel). The pixel-wise softmax can correspond with a per-pixel loss function. The TA module is able to integrate the temporal information from multiple frames and generate better features for processing and analytics performed by pose estimation network 114.

At block 440, the pose estimation network generates an output heatmap using a main feature extracting process. For example, the main feature extraction component will be applied, which processes the low-level feature through a stacked-hourglass like architecture and outputs features containing both high-level and low-level information about certain key points.

In some examples, a heatmap regressor may produce heatmaps for some or all of the key points through several simple convolutions and generate key point locations under the original resolution.

Figure 5:
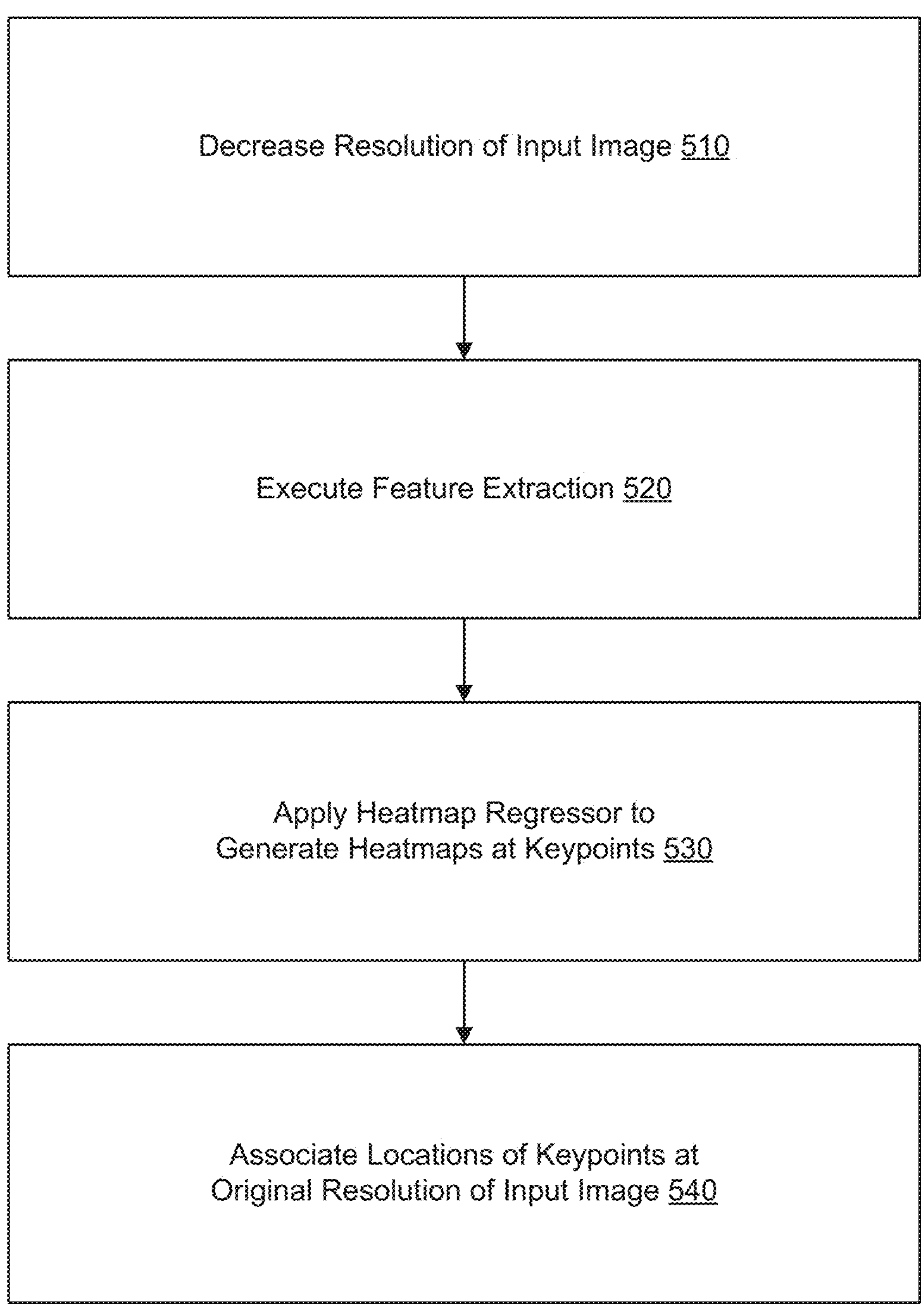
FIG. 5 provides a process for detecting line segments and pose estimation, in accordance with the embodiments disclosed herein.

FIG. 5 provides a process for detecting line segments and pose estimation, in accordance with the embodiments disclosed herein.

At block 510, the resolution for the input images may be reduced (e.g., by image input module 110 of FIG. 1). The images may be received from a user device that captures the images, for example, of a user performing a golf swing with a golf club.

At block 520, a feature extraction process may be implemented (e.g., by TA module 112 of FIG. 1).

At block 530, a heatmap regressor may be applied to the feature maps to generate heatmaps at key points (e.g., by pose estimation network 114 of FIG. 1).

At block 540, locations of key points may be associated with the input image at the original resolution (e.g., by update segment engine 116 of FIG. 1).

Figure 6:
FIG. 6 illustrates a comparison between an input image and output image with line segmentation detection results, in accordance with the embodiments disclosed herein.
Figure 6:
Figure 7:
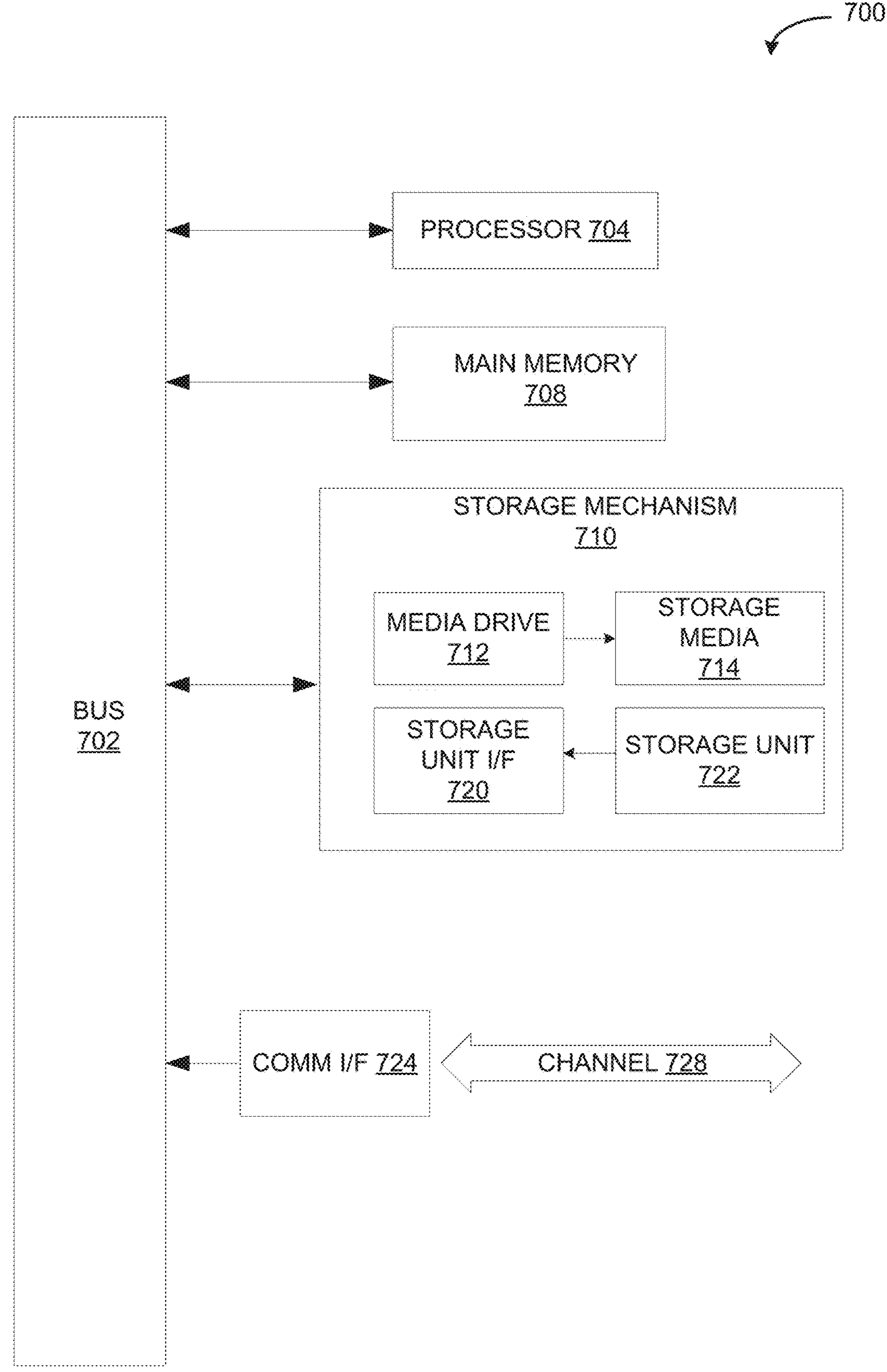
FIG. 7 an example of a computing system that may be used in implementing various features of embodiments of the disclosed technology.

FIG. 6 illustrates a comparison between an input image and output image with line segmentation detection results, in accordance with the embodiments disclosed herein. In this example, the system accurately identifies the golf club shaft in the second image 620 (illustrated by the red/bold line), whereas several portions of the image are mistakenly identified as the golf club shaft in the first image 610. Based on the prediction results from the pose estimation model, the golf club shaft in the second image 620 corresponds with the image portion within the bounding box that covers the whole golf club and applies the line segment detection algorithm to the cropped region. The output of the line segment detection can include unconnected, short line segments pointing in various directions since line segment detection only depends on pixel information. The lines outside of the bounding box may be removed from the identification of the golf club shaft in the second image 620 whereas the image components that do not match the golf club shaft connect with other line-shape elements in the environment, like grass and ground.

Where components, logical circuits, or engines of the technology are implemented in whole or in part using software, in one embodiment, these software elements can be implemented to operate with a computing or logical circuit capable of carrying out the functionality described with respect thereto. One such example logical circuit is shown in FIG. 7. Various embodiments are described in terms of this example logical circuit 700. After reading this description, it will become apparent to a person skilled in the relevant art how to implement the technology using other logical circuits or architectures.

Referring now to FIG. 7, computing system 700 may represent, for example, computing or processing capabilities found within desktop, laptop, and notebook computers; hand-held computing devices (PDA's, smart phones, cell phones, palmtops, etc.); mainframes, supercomputers, workstations, or servers; or any other type of special-purpose or general-purpose computing devices as may be desirable or appropriate for a given application or environment. Logical circuit 700 might also represent computing capabilities embedded within or otherwise available to a given device. For example, a logical circuit might be found in other electronic devices such as, for example, digital cameras, navigation systems, cellular telephones, portable computing devices, modems, routers, WAPs, terminals and other electronic devices that might include some form of processing capability.

Computing system 700 might include, for example, one or more processors, controllers, control engines, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of logical circuit 700 or to communicate externally.

Computing system 700 might also include one or more memory engines, simply referred to herein as main memory 708. For example, preferably random-access memory (RAM) or other dynamic memory, might be used for storing information and instructions to be executed by processor 704. Main memory 708 might also be used for storing temporary variables or other intermediate information during execution of instructions to be executed by processor 704. Logical circuit 700 might likewise include a read only memory ("ROM") or other static storage device coupled to bus 702 for storing static information and instructions for processor 704.

The computing system 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive might be provided. Accordingly, storage media 714 might include, for example, a hard disk, a floppy disk, magnetic tape, cartridge, optical disk, a CD or DVD, or other fixed or removable medium that is read by, written to, or accessed by media drive 712. As these examples illustrate, the storage media 714 can include a computer usable storage medium having stored therein computer software or data.

In alternative embodiments, information storage mechanism 740 might include other similar instrumentalities for allowing computer programs or other instructions or data to be loaded into logical circuit 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory engine) and memory slot, a PCMCIA slot and card, and other fixed or removable storage units 722 and interfaces 720 that allow software and data to be transferred from the storage unit 722 to logical circuit 700.

Logical circuit 700 might also include a communications interface 724. Communications interface 724 might be used to allow software and data to be transferred between logical circuit 700 and external devices. Examples of communications interface 724 might include a modem or soft modem, a network interface (such as an Ethernet, network interface card, WiMedia, IEEE 802. XX or other interface), a communications port (such as for example, a USB port, IR port, RS232 port, Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the logical circuit 700 to perform features or functions of the disclosed technology as discussed herein.

Although FIG. 7 depicts a computer network, it is understood that the disclosure is not limited to operation with a computer network, but rather, the disclosure may be practiced in any suitable electronic device. Accordingly, the computer network depicted in FIG. 7 is for illustrative purposes only and thus is not meant to limit the disclosure in any respect.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical, or physical partitioning and configurations can be implemented to implement the desired features of the technology disclosed herein. Also, a multitude of different constituent engine names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "engine" does not imply that the components or functionality described or claimed as part of the engine are all configured in a common package. Indeed, any or all of the various components of an engine, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system configured for implementing a temporal-based two-dimensional (2D) human pose estimation method for golf swing analysis using temporal information to improve pose estimation for changing positions and partially self-occluded key points, the system comprising:

one or more hardware processors configured by machine-readable instructions to:

select a first image as a representative image from a video sequence comprising a plurality of temporally adjacent frames to the first image;

determine a bounding box to incorporate with the first image of the video sequence received from a user device;

initiate a temporal 2D inference process on the first image to generate a second 2D image, wherein the temporal 2D inference process aggregates features across temporally adjacent frames is executed on the first image within the bounding box and the temporal 2D inference process generates a set of confidence scores for one or more key points of the first image within the bounding box;

provide a second 2D image and the set of confidence scores for at least one key point of the one or more key points of the first image to a three-dimensional (3D) inference process and Perspective-n-Point (PnP) process;

generate a 3D image using output from the 3D inference process, wherein the 3D image is modified based a distance value between a user and a camera of the user device that is determined by the PnP process; and provide the 3D image to the user device.

2. The system of claim 1, wherein the one or more hardware processors configured by the machine-readable instructions are further configured to:

receive one or more input images from the user device, wherein the one or more input images are each associated with an original resolution;

for each of the one or more input images, reduce the original resolution of the one or more input images to a reduced resolution;

initiate a feature extraction process on the one or more input images stored at the reduced resolution to generate one or more feature maps of the one or more input images;

apply a heatmap regressor to each of the one or more feature maps; and associate locations of key points with the one or more input images at the original resolution.

3. The system of claim 1, wherein the PNP process estimates a relative pose of the user between the user and the user device given a set of correspondences between 3D points and their projections on an image plane.

4. The system of claim 1, wherein the bounding box is programmatically placed around the key points of the first image by predicting locations of a golf club and the user.

5. The system of claim 1, wherein the first image received from the user device is included with a series of three images and a second or a third image from the series of three images.

6. The system of claim 1, wherein the one or more hardware processors configured by the machine-readable instructions are further configured to: train a machine learning (ML) model to recognize people and sports equipment based on images that show these objects and do not show these objects.

7. The system of claim 1, wherein the one or more hardware processors configured by the machine-readable instructions are further configured to:

train a machine learning (ML) model to programmatically learn differences between pixel data and objects in the first image to recognize people and golf clubs in other images.

8. The system of claim 1, wherein the one or more hardware processors configured by the machine-readable instructions are further configured to:

use a trained machine learning (ML) model to predict a location of a person and a golf club in the first image and place the bounding box around the person and the golf club.

9. The system of claim 8, wherein the trained ML model includes a reduced number of layers in a convolution of the trained ML model than traditional ML models.

10. The system of claim 1, wherein the temporal 2D inference process is initiated to determine X and Y coordinates with a confidence score for each point.

11. The system of claim 1, wherein the one or more hardware processors configured by the machine-readable instructions are further configured to:

apply a line segment detection algorithm, as part of the temporal 2D inference process, to a portion of the first image within the bounding box; and generate, using the line segment detection algorithm, output comprising a set of unconnected line segments pointing in various directions.

12. The system of claim 11, wherein generation of the set of unconnected line segments depend only on pixel information, rather than connecting lines in the first image.

13. The system of claim 11, wherein the set of confidence scores for one or more key points of the first image within the bounding box correspond with a number that represents a likelihood that output of a line segment detection algorithm within the bounding box is correct.

* * * * *